(12) United States Patent
Lee (10) Patent No.: US 6,655,851 B1
(45) Date of Patent: Dec. 2, 2003

(54) OPTICAL FIBER CONNECTOR

(75) Inventor: Hsin Lee, Issaquah, WA (US)

(73) Assignee: Fiberon Technolgies, Inc., Issaquah, WA (US)

( * ) Notice: Subject to any disclaimer, the term of this patent is extended or adjusted under 35 U.S.C. 154(b) by 0 days.

(21) Appl. No.: 10/154,637

(22) Filed: May 22, 2002

(51) Int. Cl.⁷ ................................................ G02B 6/36
(52) U.S. Cl. ...................................................... 385/78
(58) Field of Search ............................. 385/72, 78, 90, 385/55, 60, 66, 67

(56) References Cited

U.S. PATENT DOCUMENTS

| | | | | |
|---|---|---|---|---|
| 5,212,752 A | * | 5/1993 | Stephenson et al. | 385/78 |
| 5,390,269 A | * | 2/1995 | Palecek et al. | 385/78 |
| 5,428,703 A | * | 6/1995 | Lee | 385/78 |
| 5,515,466 A | * | 5/1996 | Lee | 385/78 |
| 5,809,192 A | * | 9/1998 | Manning et al. | 385/78 |
| 6,224,270 B1 | * | 5/2001 | Nakajima et al. | 385/78 |
| 6,302,594 B1 | * | 10/2001 | Lee | 385/87 |
| 6,318,905 B1 | * | 11/2001 | Valencia et al. | 385/78 |
| 6,428,215 B1 | * | 8/2002 | Nault | 385/78 |
| 6,533,468 B2 | * | 3/2003 | Nakajima et al. | 385/78 |

* cited by examiner

Primary Examiner—Tulsidas Patel
(74) Attorney, Agent, or Firm—Delbert J. Barnard (57) ABSTRACT

A turning tool (12) is inserted into the forward end of an outer housing (26) and its turning tips (18) are moved into tip receiving openings (24) at the base of the flange (26). The turning too (12) is both pushed and rotated. The pushing moves the flange (46) back from the flange (24). The rotation rotates the inner housing (28), a ferrule (20) and an end portion of the cable, including an optical fiber (F) that is within the center line opening (78) in the ferrule (20). After the components have been rotated to provide a desired rotational position, the turning tool (12) is removed. Friction forces between the flange (46) and the flange (24) and between the cylindrical surface (48) and the cylindrical opening within the key ring (52) hold the components in the azimuthal position that was established.

16 Claims, 6 Drawing Sheets

OPTICAL FIBER CONNECTOR

TECHNICAL FIELD

This invention relates to plug and receptacle connections for joining two fiber optic cables together for optical energy transmission from one cable to the other. More particularly, it relates to the provision of an optical fiber connector that includes a tubular ferrule for receiving a bared end portion of an optical fiber and to a construction. of the connector that allows for an adjustment of the angular position of the optical fiber by rotating the ferrule and an end portion of a fiber optic cable that extends into the connector until a desired rotational alignment of the optical fiber is achieved, at which time the end portion of the fiber optics cable is fixed in position relative to the connector so that the rotational alignment of the optical fiber is maintained.

BACKGROUND OF THE INVENTION

Figure 1:
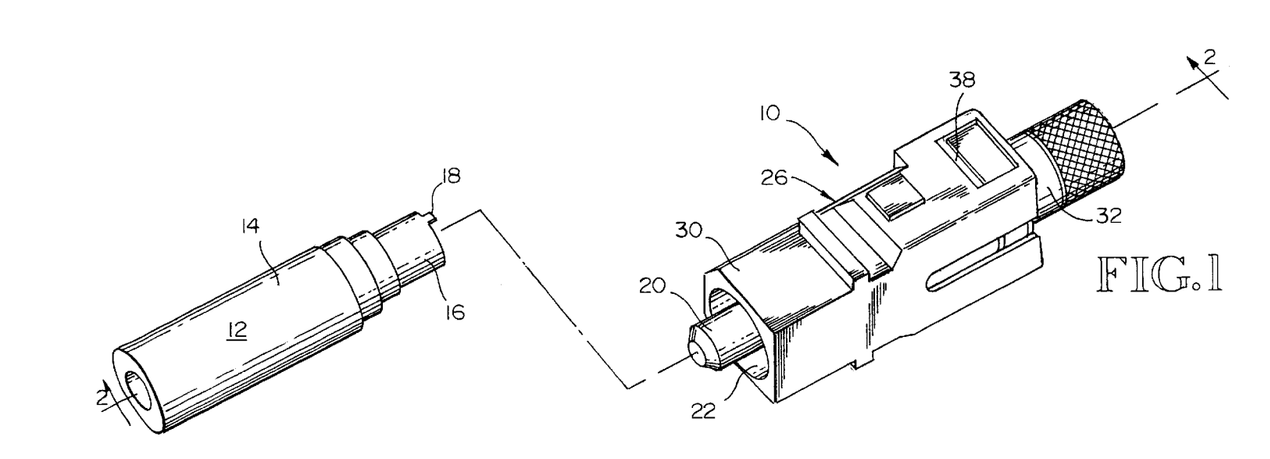
FIG. 1 is a pictorial view of an embodiment of the connector of the present invention and a turning tool that is provided for rotating an inner portion of the connector.

FIG. 1 of my allowed, pending U.S. application Ser. No. 09/649,283, filed Aug. 28, 2000, and entitled Plug And Receptacle Connection For Optical Fiber Cables With Alignment Feature, presents one example of a plug and receptacle connection for an optical fiber cable. application Ser. No. 09/649,283 sets forth a detailed description of the need for rotational alignment of the two optical fibers that are to be joined in order to obtain optimum results in the transmission of optical energy from one optical cable to the other optical cable. application Ser. No. 09/649,283 discusses prior art alignment systems that allow for a set number of azimuthal positions of the two cables. application Ser. No. 09/649,283 also discloses an alignment system in which an infinite number of azimuthal positions can be obtained. The present invention provides another way of adjustably positioning an end portion of a fiber optic cable and its optical fiber in an infinite number of azimuthal positions, for achieving optimum optical energy transmission from a first cable to a second cable.

BRIEF SUMMARY OF THE INVENTION

The optical fiber connector of the present invention is basically characterized by a tubular outer housing and a tubular inner housing within the outer housing. The tubular inner housing comprises a forwardly opening front socket and a rearwardly opening rear socket that is in axial alignment with the front socket. A rear portion of a tubular ferrule is received within the front socket of the inner housing. The tubular ferrule has a center opening that is sized to receive a bared optical fiber. The tubular ferrule also has a front portion that extends forwardly from the rear portion of the ferrule and the front socket. A key ring is provided in the outer housing surrounding the front socket of the inner housing. The key ring is held against rotation relative to the outer housing and it includes a cylindrical inner surface. The front socket has a cylindrical outer surface that is sized to receive the cylindrical inner surface of the key ring. The cylindrical surfaces are sized such that the cylindrical inner surface of the key ring frictionally engages the cylindrical outer surface on the front socket. The inner housing and the ferrule are rotatable in position relative to the outer housing and the key ring when a rotational force is applied to them that is sufficient to overcome the friction between the cylindrical inner surface of the key ring and the cylindrical outer surface on the front socket.

In preferred form, the key ring periphery includes alternating projections and cavities and the tubular outer housing includes complementary projections and cavities. The projections on the key ring are received in the cavities in the outer housing and the projections on the outer housing are received in the cavities in the key ring. The projections and cavities lock the key ring to the outer housing and prevent the key ring from rotating relative to the outer housing.

Preferably, the tubular inner housing has a radially outwardly directed flange at its front end that is positioned to block forward movement of the key ring along the cylindrical outer surface of the front socket of the inner housing. Preferably also, the inner housing has a radially outwardly projecting girth ridge on it that is spaced axially rearwardly from the flange. The flange, the ridge and the cylindrical outer surface together define a girth groove surrounding the inner housing in which a base portion of the key ring is received. The ridge blocks rearward movement of the key ring along the cylindrical outer surface on the front socket of the inner housing.

In preferred form, the tubular inner housing comprises a forwardly facing tool receiving portion that is radially outwardly of the front socket. The tool receiving portion is sized and shaped for receiving a complementary end portion of a tool that is used for rotating the tubular inner housing and the tubular ferrule relative to the outer housing. The tool receiving portion may comprise at least one forwardly directed tool-tip receiving opening in the forward end of the tubular inner housing. Preferably, however, the tool engaging portion comprises at least two forwardly directed tool-tip receiving openings in the forward end portion of the tubular housing. These openings are circumferentially spaced apart and are radially outwardly from the front socket. Preferably, there are two tool-tip receiving openings that are spaced substantially one hundred and eighty degrees (180°) apart.

In the preferred embodiment, the outer housing includes a front section and a rear section and the two sections are telescopically connected together. The front section of the outer housing has a rearwardly directed socket and the rear section of the outer housing has a forwardly directed tubular pin that fits into the rearwardly directed socket in the front section of the outer housing. A lock structure is provided for connecting the front section of the outer housing to the rear section of the outer housing. This lock structure may comprise of at least one opening in a side wall of one of the housing sections and a complementary projection on the other housing section. By way of an example, the front section of the outer housing may include side wall openings on opposite sides of the front section. The rear section of the outer housing may include projections sized and positioned to snap fit into the openings in the front section when the rear section is telescopically moved into the front section.

Preferably, the rear section of the outer housing includes a central opening in which a rear portion of the inner housing is received. The inner housing includes a radial shoulder, intermediate its ends. The rear section of the outer housing includes a radial shoulder intermediate its ends that is spaced rearwardly from the radial shoulder on the inner housing. A coil spring is positioned within the rear section of the outer housing in a position surrounding a middle portion of the inner housing. The spring has a first end that abuts against the radial shoulder on the inner housing and a second end that abuts against the radial shoulder on the rear section of the outer housing. This spring biases the inner housing, the lock ring and the ferrule axially forwardly within the outer housing.

The front section of the outer housing may include a radially inwardly directed flange that is forwardly contiguous the radially outwardly directed flange at the front end of the inner housing. The coil spring biases the flange on the inner housing forwardly against the flange on the outer housing.

Other objects, advantages and features of the invention will become apparent from the description of the best mode that is set forth below, form the drawings, from the claims and from the principals that are embodied in the specific structures that are illustrated and described.

BRIEF DESCRIPTION OF THE SEVERAL VIEWS OF THE DRAWINGS

Like reference numerals and letters are used to designate like parts throughout the several views of the drawing, and.

DETAILED DESCRIPTION OF THE INVENTION

Figure 2:
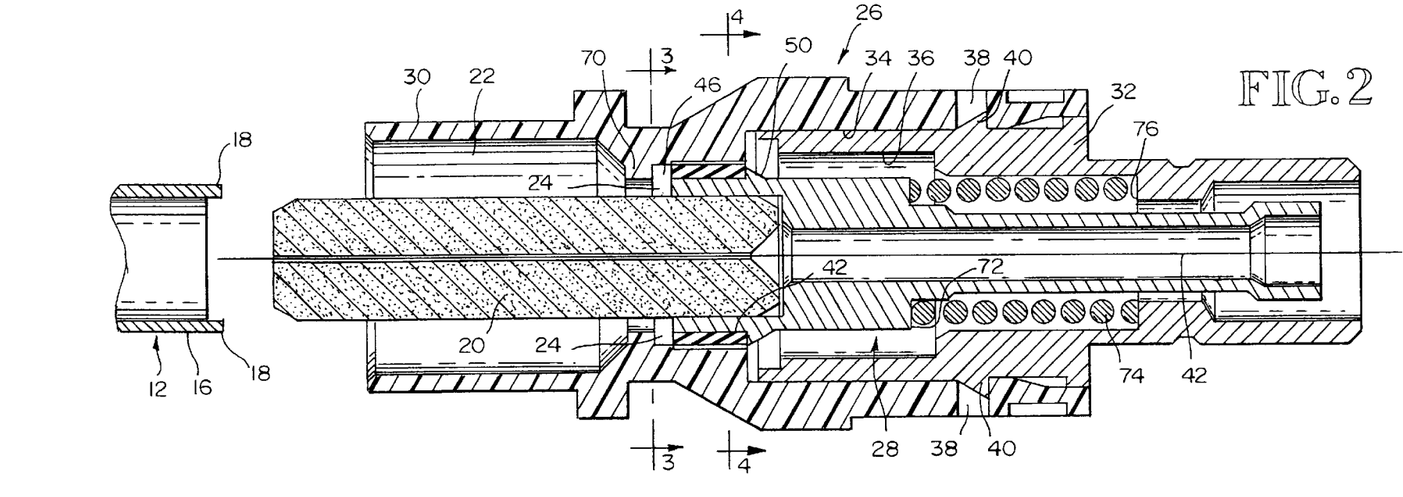
FIG. 2 is an enlarged scale axial sectional view of the connector shown by FIG. 1, and the tip portion of the tool, such view showing the tip portion of the tool spaced axially outwardly from a ferrule portion of the connector.
Figure 3:
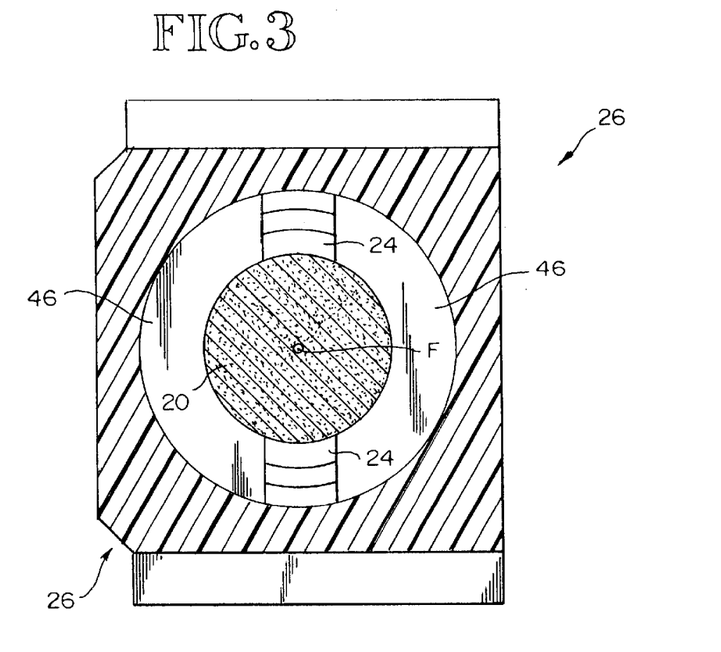
FIG. 3 is a cross-sectional view taken substantially along line 3—3 of FIG. 2.

FIG. 1 shows a connector 10 in a spaced relationship with a turning tool 12 that performs a function similar to that of a screwdriver. Tool 12 comprises a handle 14, a cylindrical end portion 16 and a pair of tool tips or lugs 18 that axially project forwardly from the cylindrical portion 16. The tips 18 are identical and are diametrically opposite each other. As will hereinafter be described in some detail, the cylindrical portion 16 of the tool 12 is sized to receive a ferrule 20. The cylindrical portion 16 has a side wall that is positioned outwardly of and surrounds the ferrule 20. As shown by FIG. 2, tool 12 is adapted to be moved into the cavity 22 until its tips 18 are within tool-tip receiving openings 24.

The connector 10 comprises an outer housing 26 and an inner housing 28. Outer housing 26 is a front section 30 and a rear section 32. Front section 30 has a forwardly directed cavity 22 or socket and a rearwardly directed socket 34. The rear section 32 has a forwardly projecting tubular pin portion 36 that is telescopically received within the socket 34. Side wall openings 38 are provided in the wall that forms the socket 34. The rear section 32 includes barbs 40 which have front surfaces that slope rearwardly and rear surfaces that are substantially perpendicular to center line 42. The sloping front surfaces allows the rear section 32 to be moved forwardly into the rear socket 34. The sloping front surfaces push outwardly on the wall portions of the housing that are rearwardly of the openings 38. When the barbs 40 become aligned with the openings 38, they snap outwardly into the openings 38. The rear surfaces of the barbs contact rear boundaries of the openings 38 and prevent easy withdrawal of the rear section 32 from the socket 34.

Figure 8:
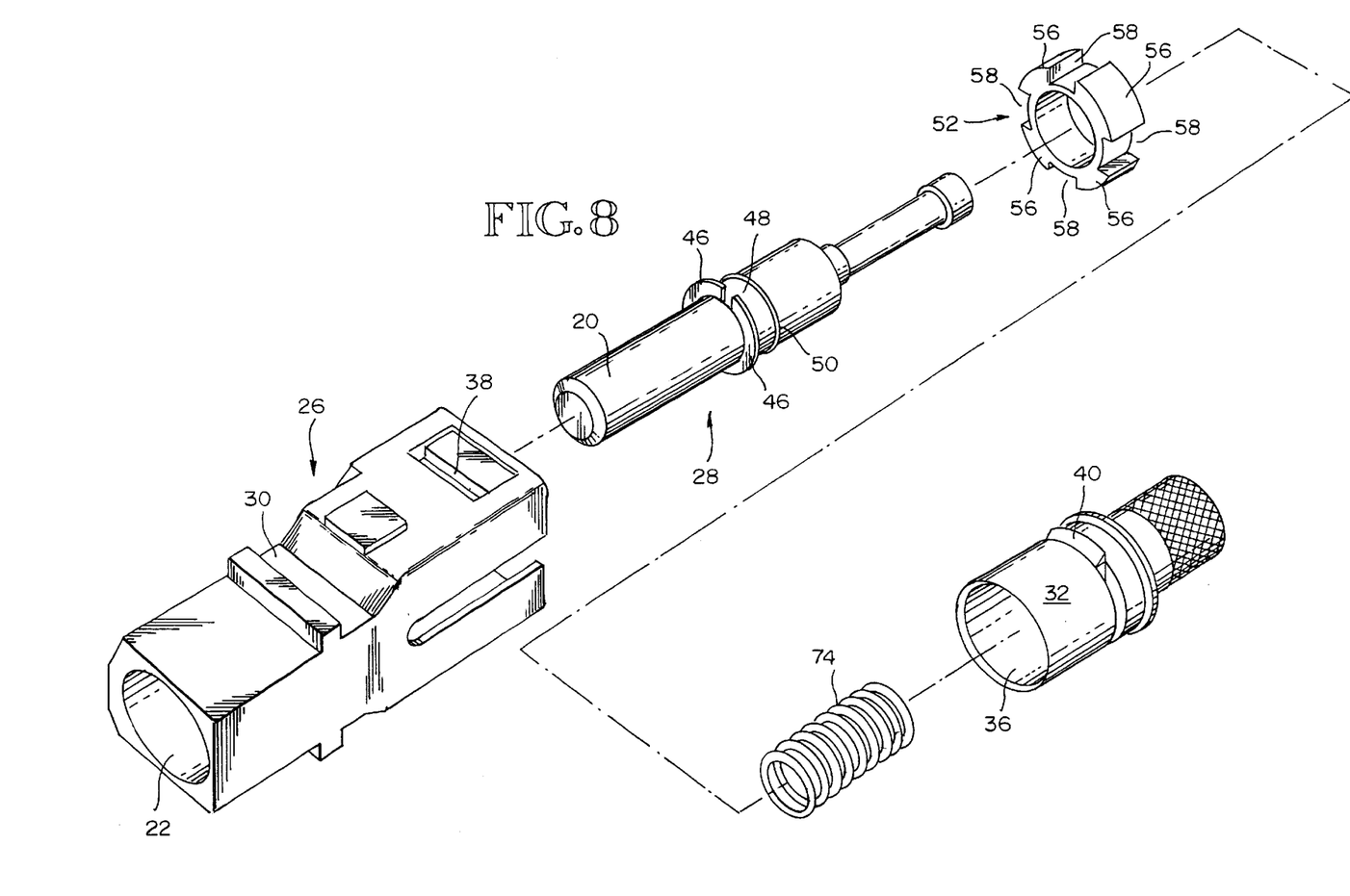
FIG. 8 is an exploded pictorial view of the connector. shown by FIGS. 1–5.
Figures 9, 10, 11:
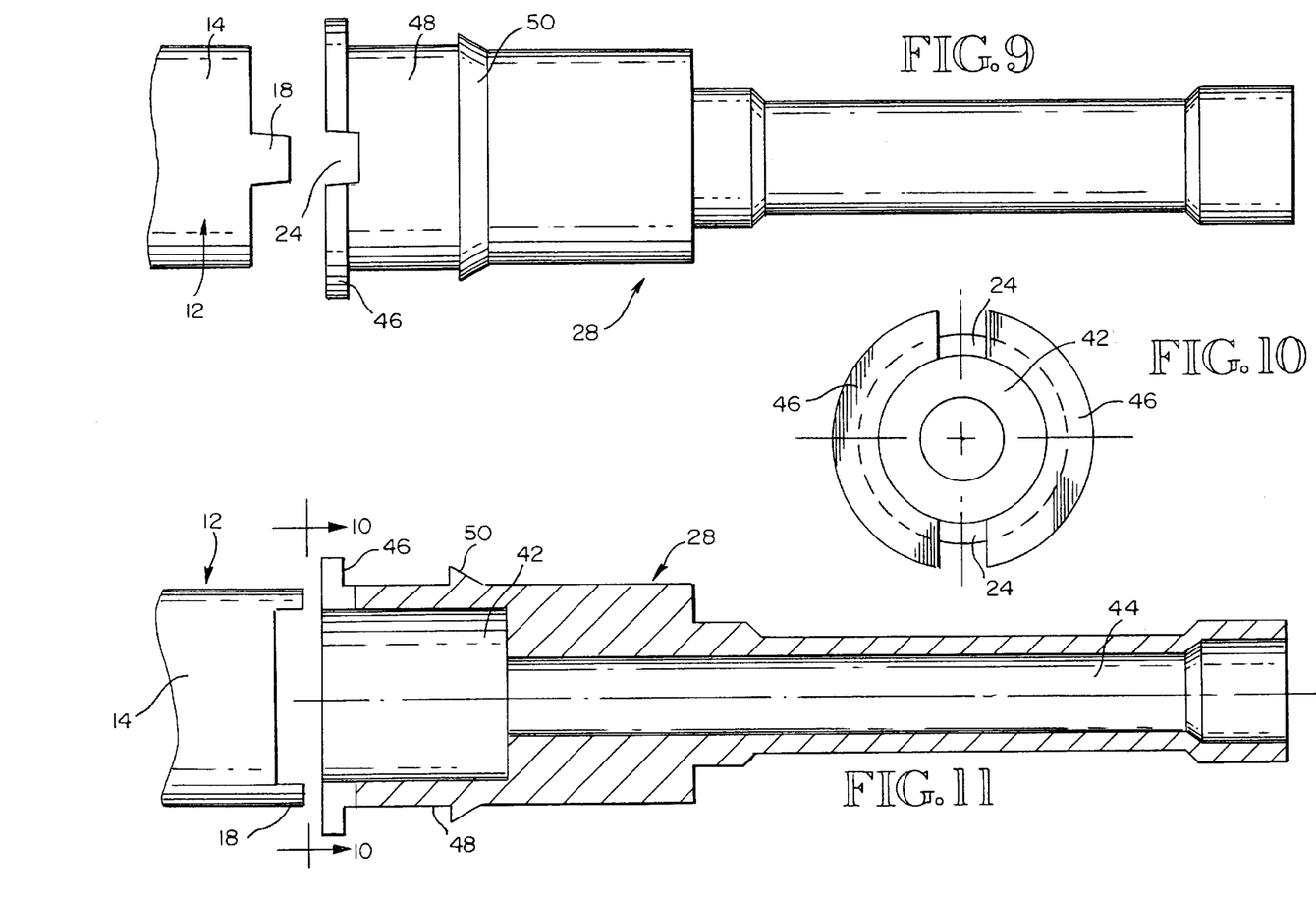
FIG. 9 is an enlarged top plan view of the inner housing portion of the, connector, including a fragmentary end portion of the turning tool, and showing the turning tips in axial alignment with the tip receiving recesses in the front end of the inner housing.
FIG. 10 is an end view of the inner housing taken substantially along line 10—10 of FIG. 11.
FIG. 11 is an axial sectional view of the inner housing taken substantially along line 11—11 of FIG. 10.

The inner housing 28 is best shown by FIGS. 9–11. It is tubular in form and has a short and wide front socket 42 and a long and narrow rear socket 44. As shown by FIG. 11, the front socket 42 opens forwardly and the rear socket 44 opens rearwardly. Inner housing 28 includes a radial flange 46 at its forward end. Flange 46 extends about the inner housing 28 except for in the regions of the tool-tip openings 24. The outer surface 48 of the socket 42 is cylindrical. An annular ridge 50 projects radially outwardly form the outer surface at a location spaced rearwardly from the flange 46. Ridge 50 has a cross-section like the barbs 40. Its front surface is radial and its rear. surface slopes rearwardly. The flange 46, the cylindrical surface 48 and the ridge 40 together define a channel that extends about the socket 42. This channel is herein sometimes referred to as a "girth" channel. It receives the base portion of a key ring 52 which is most clearly shown in FIGS. 5 and 8. Key ring 52 has a width that is substantially equal to the axially distance between flange 46 and ridge 50. It includes a cylindrical inner surface 54 and radial projections 56 and radial recesses 58 that alternate around the circumference of the key ring 52.

Figure 4:
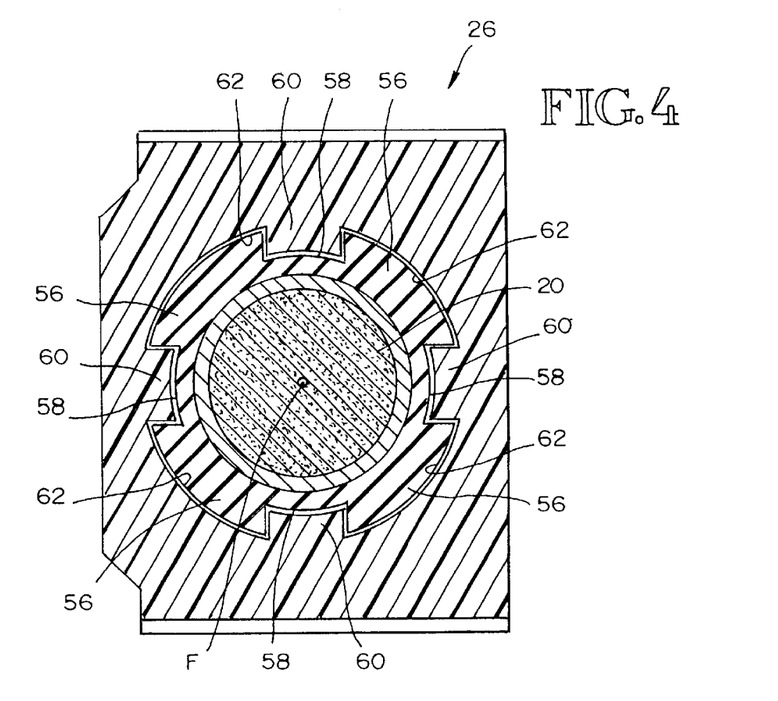
FIG. 4 is a cross-sectional view taken substantially along line 4—4 of FIG. 2.
Figure 5:
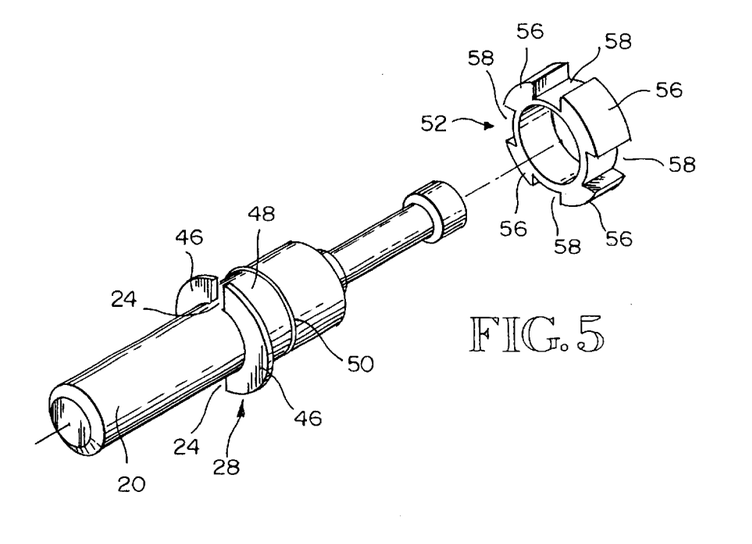
FIG. 5 is a pictorial view of an inner housing component of the connector shown by FIGS. 1–4 and a ferrule at the forward end of the inner housing, both spaced in position relative to the key ring that is shown in FIG. 4 to be connected to the outer housing of the connector.
Figures 6, 7:
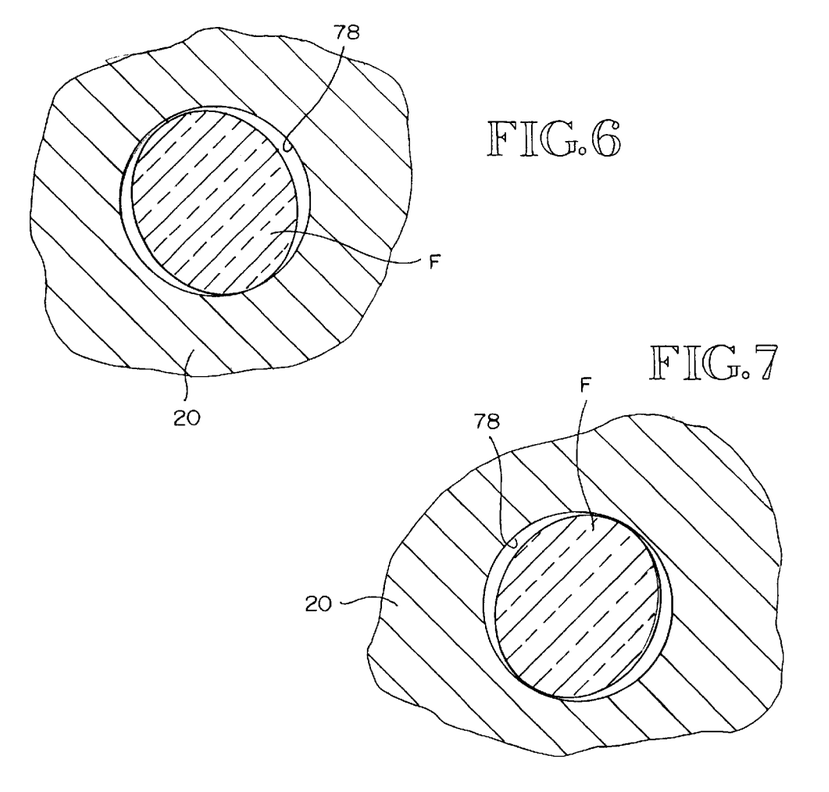
FIG. 6 is an enlarged scale fragmentary sectional view taken through the ferrule and an optical fiber in the ferrule, such view showing a first azimuthal position of the optical fiber.
FIG. 7 is a view like FIG. 6, but showing the optical fiber rotated into a second azimuthal position relative to the ferrule.

As shown by FIG. 4, the front section 30 of the outer housing 26 includes a region composed of alternating projections 60 and recesses 62. The projections 60 are sized to be received within the recesses 58 and the key ring 52. The recesses 62 are sized to receive the projections 56 on the key ring 52. Referring to FIGS. 5 and 8, the key ring 52 is slipped onto the inner housing 28 from the rear end of the inner housing 28. It is moved forwardly until it reaches the ridge 50. Then, it is forced forwardly over the ridge 50 and onto the cylindrical surface 48. The sloping rear surface on the ridge 50 helps to cam the key ring 52 forwardly. When the key ring 52 is forwardly of the ridge 50, it is trapped axially between the flange 46 and the ridge 50. The radial front surface on the ridge 50 confronts a radial rear surface on the key ring 52 and blocks the key ring 52 from sliding rearwardly past the ridge 50. The interlocking projections 56,60 and recesses 58,62 hold the key ring 52 against rotation relative to the front section 30 of the housing 26.

The diameter of the flange 46 is slightly smaller than the diameter defined by the inner surfaces of the projections 60.

Figure 12:
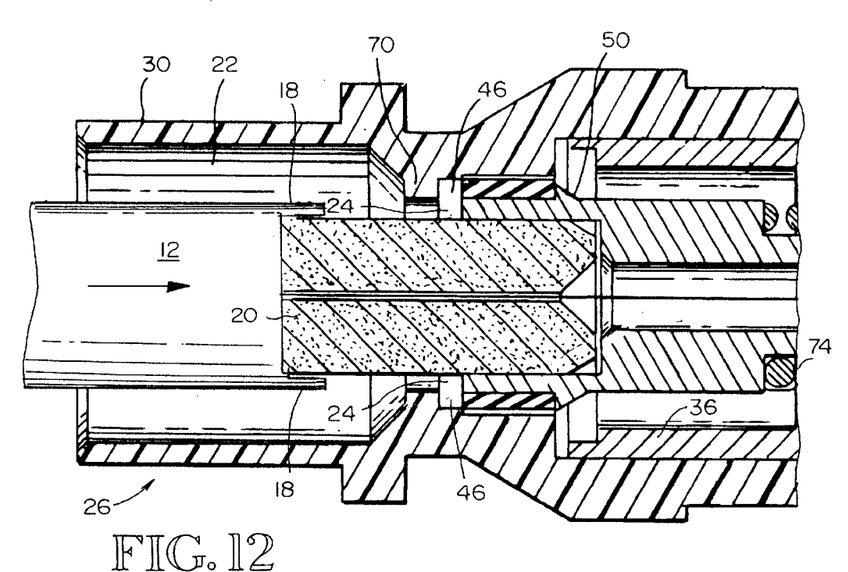
FIG. 12 is an enlarged scale fragmentary view of the left end portion of FIG. 2, showing the turning tool in side elevation being moved into the end portion of the connector, in a position surrounding. the ferrule, and showing the turning tips on the tool aligned with sockets for them provided in the outer end of the inner housing.
Figure 13:
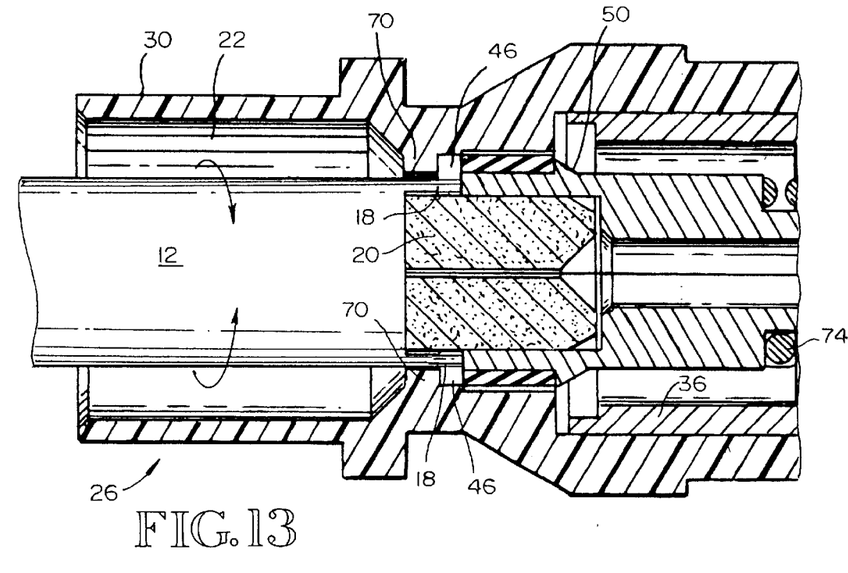
FIG. 13 is a view like FIG. 12, but showing the turning tool moved further into the connector, and showing the tips of the turning tool positioned in the socket, provided for them in the forward end portion of the inner housing.

This allows the flange 46 to be moved into the position shown in FIGS. 2, 12 and 13, by an insertion of the inner housing and the key ring 52 through the space formed by the projections 60 and then moved forwardly until the flange 46 contacts the flange 70.

Referring to FIG. 2, the front section 30 of the outer housing 26 includes a radially inwardly extending flange 70. Flange 70 includes a rear radial surface that is contacted by the front radial surface of the front end of flange 46 on the inner housing member 28. Intermediate its ends, inner housing 28 includes a radial shoulder 72 that provides an abutment for the forward end of a coil compression spring 74. The rear section 32 of the outer housing 26 includes a radial flange 76 which forms an abutment for the rear end of the coil spring 74. The spring 74 is slightly compressed when it is in the position shown by FIG. 2. It exerts a force on the inner housing 28, moving it forwardly relative to the rear section 32 of the outer housing 26. Spring 74 biases the radial flange 46 in the contact with the radial flange 70.

U.S. Pat. No. 6,302,594, granted Oct. 16, 2001, to Hsin Lee, and assigned to Fiberon Technologies, Inc., discloses one way of connecting an end portion of an optical fiber cable to the connector, with a bared end portion of the optical fiber extending through a center line opening in the ferrule. Herein, a fiber receiving opening in ferrule 20 is designated 78 and the optical fiber is designated F. The manner of securing the end portion of the cable to the rear housing 28 is not a part of the present invention and so it will not be discussed any further. The important thing is that an end portion of the optical cable is connected to the inner housing 28 and a bared portion of the optical fiber F extends forwardly through the opening 78 in the ferrule 20.

The end portion of the cable is connected to the inner housing 28 while the rear section 32 of the outer housing 26 is moved rearwardly along the cable. Once the inner housing 28 is connected to the; end portion of the cable, and the bared optical fiber F is within the opening 78 and ferrule 20, the spring 74 is installed and the outer section 32 of the outer housing 36 is moved forwardly until the barbs 40 are within the openings 38. During this movement, the spring 74 is compressed once the rear section 32 is connected to the front section 30, by the barbs 40 being positioned within the openings 38, the spring 74 biases the flange 40 on the front end of the inner housing 28 against the flange 46 that is inside of the forward section 30 of the outer housing 26. Next, the ferrule 20, the inner housing 28 and the end portion of the optical cable, including the bared portion of the optical fiber F that is within the opening 78 in the ferrule 20, are rotated for the purpose of providing a desired rotation position of the optical fiber F. The cylindrical end portion 16 of the turning tool 12 is moved towards into the space 22 about the ferrule 20. The tool 12 is moved forwardly until its tips or lugs 18 are within the opening 24 in the flange 46 that is at the forward end of the inner housing 28. The turning tool 12 is moved inwardly and at the same time it is rotated. The inward movement will move the inner housing 28 rearwardly against the spring 74. The rotational movement of the tool 12 will cause the lugs to function in the openings 24 much like the tip of a screwdriver in the slot of a screw. As the tool 12 is turned or rotated, it in turn rotates the inner housing 28 and the ferrule 20 that is carried by the inner housing 28. It also rotates the optical fiber F about its axis. After a desired rotational position of the optical fiber F is achieved, the tool 12 is removed. The spring 74 once again forces the flange 46 forwardly against the flange 46. Also, there is a frictional grip between the inner surface of key ring 52 and the cylindrical outer surface of the front end socket 42 in the inner housing 28. The pressure of the flange 46 against the flange 24 and the friction between the cylindrical surface 48 and the cylindrical inner surface of the key ring 52 hold the alignment that was obtained by the rotation of the inner housing 28, the ferrule 20 and the optical fiber F. As can be appreciated, this matter of locking the inner housing 28 to the outer housing 26 provides for adjustably affixing the optical fiber F in an infinite number of azmuthal positions within the connector.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather are to be determined by the following claims, interpreted according to accepted doctrines of patent claim interpretation, including use of the doctrine of equivalents and reversal of parts.

What is claimed is:

1. An optical fiber connector, comprising:

a tubular outer housing;

a tubular inner housing inside said outer housing;

said tubular inner housing comprising a forwardly opening front socket and a rearwardly opening rear socket that is in axial alignment with the front socket;

a tubular ferrule having a center opening sized to receive an optical fiber, a rear portion received within the front socket of the inner housing, and a front portion extending forwardly from the rear portion and the front socket;

a key ring in the outer housing surrounding the front socket of the inner housing, said key ring being held against rotation relative to the outer housing;

said key ring having a cylindrical inner surface;

said front socket having a cylindrical outer surface;

said cylindrical inner surface of the key ring and said cylindrical outer surface of the front socket being sized such that the cylindrical inner surface of the key ring frictionally engages the cylindrical outer surface on the front socket; and said inner housing and said ferrule being rotatable in position relative to the outer housing and the key ring when a rotational force is applied to them that is sufficient to overcome the friction between the cylindrical inner surface of the key ring and the cylindrical outer surface on the front socket.

2. The optical fiber connector of claim 1, wherein the key ring includes alternating projections and cavities at its periphery and the tubular outer housing includes complementary projections and cavities, wherein said projections on the key ring are received in the cavities in the outer housing and said projections on the outer housing are received in the cavities in the key ring, and wherein said projections and cavities lock the key ring to the outer housing and prevent the key ring from rotating relative to the outer housing.

3. The optical fiber connector of claim 2, wherein the tubular inner housing has a radially outwardly directed flange at its front end positioned to block forward movement of the key ring along the cylindrical outer surface of the front socket of the inner housing.

4. The optical fiber connector of claim 3, wherein the inner housing has a radially outwardly projecting girth ridge spaced axially rearwardly from the flange, and said flange and said ridge and said cylindrical outer surface on the inner housing define a girth groove surrounding the inner housing in which. the key ring is received, said ridge blocking rearward movement of the key ring along the cylindrical outer surface on the front socket of the inner housing.

5. The optical fiber connector of claim 1, wherein the tubular inner housing has a radially outwardly directed flange at its front end positioned to block forward movement of the key ring along the cylindrical outer surface of the front socket of the inner housing.

6. The optical fiber connector of claim 5, wherein the inner housing has a radially outwardly projecting girth ridge spaced axially rearwardly from the flange, and said flange and said ridge and said cylindrical outer surface on the inner housing define a girth groove surrounding the inner housing in which the key ring is received, said ridge blocking rearward movement of the key ring along the cylindrical outer surface on the front socket of the inner housing.

7. The optical fiber connector of claim 1, wherein the tubular inner housing comprises a forwardly facing tool receiving portion radially outwardly of the front socket, sized and shaped for receiving a complementary end portion of a tool that is used for rotating the tubular inner housing and the tubular ferrule relative to the outer housing.

8. The optical fiber connector of claim 7, wherein the tool receiving portion is at least one forwardly directed tool tip receiving opening in the forward end of the tubular inner housing.

9. The optical fiber connector of claim 7, wherein the tool engaging portion comprises at least two forwardly directing tool tip receiving openings in the forward end portion of the tubular inner housing, said openings being circumferentially spaced apart, radially outwardly from the front socket.

10. The optical fiber connector of claim 9, wherein the tool tip receiving openings are spaced substantially one hundred and eighty degrees (180°) apart.

11. The optical fiber connector of claim 1, wherein the outer housing includes a front section and a rear section that are telescopically connected together.

12. The optical fiber connector of claim 11, wherein the front section of the outer housing has a rearwardly directed socket and the rear section of the outer housing has a forwardly directed tubular pin that fits into said rearwardly directed socket in the front section of the outer housing.

13. The optical fiber connector of claim 12, comprising lock structure for connecting the front section of the outer housing to the rear section of the outer housing, comprising at least one radial opening in one said housing section and a complementary radial projection on the other housing section.

14. The optical fiber connector of claim 13, wherein the front section of the outer housing includes side wall openings on opposite sides of the front section, and the rear section of the outer housing includes projections sized and positioned to snap fit into the openings in the front sections when the rear section is telescopically moved into the front section.

15. The optical fiber connector of claim 11, wherein the rear section of the outer housing includes a central opening in which a rear portion of the inner housing is received, wherein said inner housing includes a radial shoulder intermediate its ends, said rear section of the outer housing includes a radial shoulder intermediate its ends and spaced rearwardly from the radial shoulder on the inner housing, and a coil spring within the rear section of the outer housing and surrounding a portion of said inner housing, said spring having a first end abutted against the radial shoulder on the inner housing and a second end abutted against the radial shoulder on the rear section of the outer housing, said spring biasing the inner housing, the lock ring and the ferrule axially forwardly within the outer housing.

16. The optical fiber connector of claim 15, wherein the front section of the outer housing includes a radially inwardly projected flange that is forwardly contiguous the radially outwardly directed flange at the front end of the inner housing, wherein said coil spring biases the flange on the inner housing forwardly against the flange on the outer housing.

* * * * *